United States Patent
Beranger et al.

(10) Patent No.: US 9,370,232 B2
(45) Date of Patent: Jun. 21, 2016

(54) FLUID DISPENSER

(75) Inventors: Stephane Beranger, Surtauville (FR); Patrick Muller, Saint Aubin sur Gaillon (FR)

(73) Assignee: APTAR FRANCE S.A.S., Le Neubourg (FR)

( * ) Notice: Subject to any disclaimer, the term of this patent is extended or adjusted under 35 U.S.C. 154(b) by 480 days.

(21) Appl. No.: 13/563,096

(22) Filed: Jul. 31, 2012

(65) Prior Publication Data

US 2013/0032242 A1    Feb. 7, 2013

Related U.S. Application Data

(60) Provisional application No. 61/534,000, filed on Sep. 13, 2011.

(30) Foreign Application Priority Data

Aug. 1, 2011    (FR) ...................................... 11 57046

(51) Int. Cl.
| | |
|---|---|
| *A45D 34/00* | (2006.01) |
| *A45D 34/04* | (2006.01) |
| *G01F 11/02* | (2006.01) |
| *B05B 15/00* | (2006.01) |
| *B65D 51/32* | (2006.01) |

(52) U.S. Cl.
CPC .............. *A45D 34/04* (2013.01); *A45D 34/045* (2013.01); *G01F 11/028* (2013.01); *A45D 2200/054* (2013.01); *B05B 15/005* (2013.01); *B65D 51/32* (2013.01)

(58) Field of Classification Search
CPC ...... B05B 11/048; A45D 34/00; A45D 34/04; A45D 34/045; A45D 2200/054; G01F 11/04; G01F 11/06; G01F 11/028; B65D 47/20; B65D 47/068
USPC .................. 141/22, 23, 24; 401/119; 422/501
See application file for complete search history.

(56) References Cited

U.S. PATENT DOCUMENTS

| | | | | | |
|---|---|---|---|---|---|
| 2,130,926 | A | * | 9/1938 | Nichol | 141/20.5 |
| 3,290,946 | A | * | 12/1966 | Pursell | 73/864.15 |
| 4,278,360 | A | * | 7/1981 | Lorscheid | A45D 34/04 141/18 |
| 4,671,330 | A | * | 6/1987 | Miles | G01F 11/082 141/24 |
| 6,045,003 | A | * | 4/2000 | Seidler | 222/48 |
| RE37,931 | E | * | 12/2002 | Gueret | 401/126 |

(Continued)

FOREIGN PATENT DOCUMENTS

| | | |
|---|---|---|
| DE | 1 166 496 B | 3/1964 |
| EP | 1 621 102 A2 | 2/2006 |

(Continued)

*Primary Examiner* — Mark A Laurenzi
*Assistant Examiner* — Andrew Stclair
(74) *Attorney, Agent, or Firm* — Sughrue Mion, PLLC

(57) ABSTRACT

A fluid dispenser having a fluid reservoir, a fluid suction chamber of variable volume that defines an extraction and application space; a dip tube that connects the reservoir to the chamber at an injection orifice that defines an injection axis; and a suction mechanism for sucking, during a suction stage, fluid from the reservoir into the chamber through the injection orifice. The injection orifice is situated a little way inside or outside the extraction and application space, such that the fluid is injected in the form of an axial jet into the extraction and application space and fills it, at least in part, without the injection orifice penetrating into the space.

15 Claims, 4 Drawing Sheets

(56) References Cited

U.S. PATENT DOCUMENTS 7,040,827 B2 * 5/2006 Gueret ........................ 401/130
7,494,295 B2 * 2/2009 Delage ........................ 401/130

FOREIGN PATENT DOCUMENTS

FR     2 727 670 A1    6/1996
FR     2 924 696 A1    6/2009

* cited by examiner

FLUID DISPENSER

CROSS REFERENCE TO RELATED APPLICATION

This application claims the benefit under 35 U.S.C. §119 (e) of U.S. provisional patent application Ser. No. 61/534,000, filed Sep. 12, 2011, and priority under 35 U.S.C. §119 (a)-(d) of French patent application No. 11 57046, filed Aug. 1, 2011, the foregoing applications are incorporated herein by reference.

TECHNICAL FIELD

The present invention relates to a fluid dispenser that makes it possible to apply a fluid to a target surface by means of an applicator. Fluid is transferred from the applicator that forms an integral part of the fluid dispenser, by putting the applicator into contact with the target surface, which surface may be the skin of a user of the dispenser, for example. The present invention applies more particularly to applicator dispensers for applying fluids of low viscosity, i.e. of viscosities that are close or identical to the viscosity of water, e.g. such as perfumes, lotions, etc.

BACKGROUND OF THE INVENTION

In the prior art, such applicator dispensers are already known for taking fluid from a fluid reservoir, the applicator is then removed from the reservoir so as to come into contact with the target surface so as to apply fluid thereto. The fluid applicator may retain the fluid by any physical principle, e.g. such as capillarity. By way of example, document FR 2 924 696 is known which describes a fluid dispenser comprising: a reservoir; a metering chamber of variable volume that defines an extraction zone; a dip tube that connects the reservoir to the metering chamber; suction means for sucking fluid from the reservoir into the chamber through the dip tube; and a fluid applicator that is suitable for taking the fluid sucked into the extraction zone of the chamber. In greater detail, the dip tube extends inside the metering chamber, and more particularly inside the extraction zone, such that, at rest, when the metering chamber is at its minimum volume, the extension of the dip tube is driven fully into the extraction zone. In that document, the extraction zone is in the form of a blind tube that is open at its bottom end and closed at its top end. In addition, the bottom end defines a piston lip in leaktight sliding contact with the inside of a cylinder that is mounted in stationary manner on the reservoir. In that way, when the dispenser is at rest, the extension of the dip tube extends inside the blind tube that forms the extraction zone, which in turn is disposed inside the slide cylinder, which in turn is disposed inside the reservoir. That results in four elements being disposed in coaxial manner. However, one of the preferred embodiments of that dispenser is to opt for the various component elements to be made of transparent plastics material, so that the user can see the internal structure of the dispenser. That gives the dispenser a certain glassy look that makes it more attractive in appearance. But, the presence of the extension of the dip tube inside the extraction zone significantly degrades the transparent effect, as a result of the multiplicity of coaxial elements. In addition, from a more functional point of view, the extension of the dip tube should be made with a wall thickness that is relatively thick, so as to impart a certain stiffness thereto. Such stiffness is necessary given that the tube that forms the extraction zone must, on each actuation, be engaged around the extension. As a result of the relatively large diameter of the extension of the dip tube, the tube of the extraction zone must be made with a relatively large diameter, and this degrades firstly attractiveness, and secondly the capacity to retain fluid inside the extraction zone by capillarity.

BRIEF SUMMARY OF THE INVENTION

An object of the present invention is to remedy the above-mentioned drawbacks by defining another principle for filling the extraction zone, which principle also imparts a more attractive appearance.

To achieve this object, the present invention proposes a fluid dispenser comprising: a fluid reservoir containing fluid; a fluid suction chamber of variable volume that defines an extraction and application space; a dip tube that connects the reservoir to the chamber at an injection orifice that defines an injection axis; and suction means for sucking, during a suction stage, fluid from the reservoir into the chamber through the injection orifice; the dispenser being characterized in that the extraction and application space has a constant volume, the injection orifice being situated a little way inside or outside the extraction and application space, such that the fluid is injected in the form of an axial jet into the extraction and application space and fills it, at least in part, without the injection orifice penetrating into the space. Advantageously, the extraction and application space is situated on the injection axis, the space defining an open end that is close to the injection orifice, and a closed end that is remote from the injection orifice, the space communicating with the remainder of the chamber and the injection orifice via the open end. The injection orifice is situated outside the space or penetrates over a very short distance into the space, always being positioned in the proximity of the open end and at a distance from the closed end. Advantageously, the space is formed by a blind tube of constant volume that is secured to a grip member that is movable along the injection axis. Advantageously, the suction chamber includes a shell that, at its bottom end, defines the injection orifice, the tube being disposed in the shell. Advantageously, the shell defines a sealing slide-cylinder in which there slides a piston that is secured to the grip member in such a manner as to create suction in the chamber by pulling axially on the grip member. Advantageously, the increase in volume of the chamber during the suction stage is slightly greater than the volume of the space. Preferably, the tube and the shell are transparent, such that the fluid that fills the space is visible through the tube and the shell.

Thus, the dispenser of the invention differs from the dispenser in document FR 2 924 696 mainly by the fact that the extraction and application space contains only fluid and/or air, and never any other element of the dispenser, given that the injection orifice penetrates little, if at all, inside the extraction and application space. This particular structure has been determined in empirical manner, and the dispenser was observed to operate well without even understanding the physical principle. It was only after in depth studies that it was observed that the extraction and application space is filled, not by suction as in the prior-art document, but rather by injecting a jet under pressure through the injection orifice into the extraction and application space. It should not be forgotten that the extraction and application space includes an end that is closed in such a manner as to define a blind space: thus, the fluid cannot be sucked through the extraction and application space. When the dispenser is handled, the filling of the extraction and application space seems surprising and mysterious, since the physical principle on which filling is based is not obvious. Tests on consumers have shown that they find the handling of the dispenser is somewhat mysterious, since, à priori, the principle on which its extraction and application space is filled is incomprehensible. And the mystery is made deeper still since the tube and the shell are transparent, as is the fluid reservoir. Thus, when the extraction and application space is visible, the user may watch the extraction and application space being filled, but without being able to observe the axial jet of fluid coming from the injection orifice, since the jet is small and rapid.

By means of this particular structure in which no element of the dispenser really penetrates inside the extraction and application space, the space may present a configuration that is substantially axially cylindrical, defining an inside diameter of about 3 millimeters (mm). In addition, the space presents an axial height of about 1 centimeter (cm).

In order to accentuate the transparency of the tube, said tube may include a free bottom edge that is rounded towards the inside, and that defines the open end of the space. The shell may also be formed with a rounded bottom end, such that no sharp edge is visible at this location. Only the open end of the extraction and application space defines a sharp edge at which the fluid forms a meniscus.

According to an advantageous practical characteristic, at the start of the suction stage, the open end of the space is situated axially just above the injection orifice.

Preferably, the injection orifice may present a diameter of about 1 mm.

In another aspect of the invention, the dip tube is invisible in the fluid. Thus, the user cannot even see the dip tube connecting the reservoir to the extraction and application space.

A principle of the invention resides in the fact that the extraction and application space is filled by means of a jet of fluid under pressure, and not only by means of suction. This makes it possible firstly to leave the space free of any other part of the dispenser, and secondly to increase the stiffness of the dispenser. From an appearance point of view, attractiveness is improved considerably, given that the extraction and application space is filled only with fluid and/or air.

BRIEF DESCRIPTION OF THE DRAWINGS

The present invention is described more fully below with reference to the accompanying drawings, which show an embodiment of the present invention by way of non-limiting example.

In the figures.

DETAILED DESCRIPTION

Figure 1A:
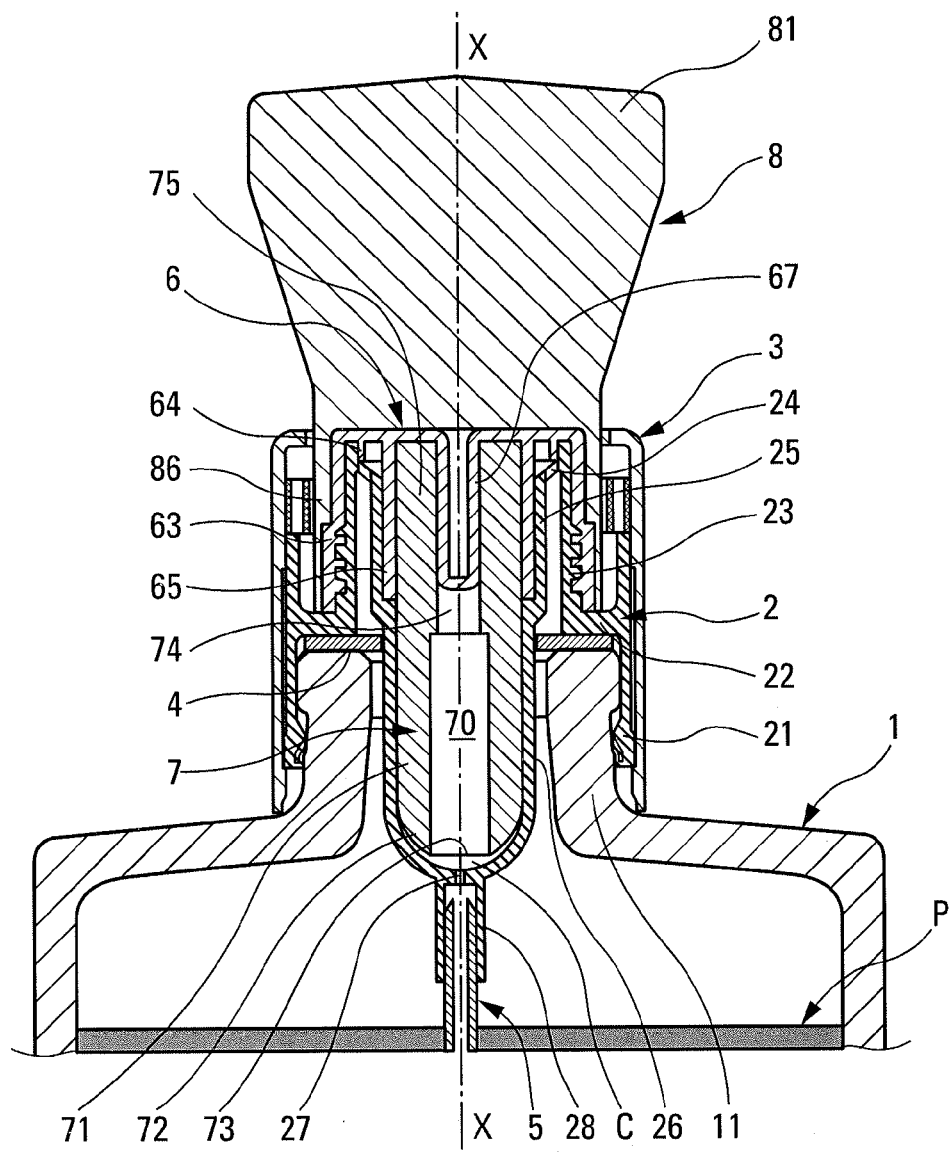
FIG. 1a is a vertical-section view through a fluid dispenser in an embodiment of the invention.

Reference is made firstly to FIG. 1a in order to explain in detail the structure of the dispenser in an embodiment of the invention. The fluid dispenser essentially comprises three component elements, namely a reservoir 1, a ring 2, and an applicator member that also serves as a removable stopper element.

The reservoir 1 may present a design that is very simple, namely in the form of a cylindrical tube that is advantageously circularly cylindrical and that presents a closed bottom and a neck 11 that defines an opening. The reservoir 1 may be made of any material, e.g. glass, appropriate plastics material, metal, etc. The reservoir is preferably transparent, at least at its neck 11. The reservoir preferably presents capacity that is small, of the order of a few milliliters. It is for filling, at least in part, with fluid P.

The ring 2 is preferably made of plastics material, e.g. by injection molding. The ring 2 is circularly symmetrical about a central axis X that is also the axis of the reservoir 1. The ring 2 includes a fastener skirt 21 for coming into engagement around the neck 11 of the reservoir in permanent and leaktight manner. The fastener skirt 21 may present profiles for coming to be housed below an annular reinforcement of the neck 11. In a variant that is not shown, the skirt 21 may present an internal thread for co-operating with an external thread that is formed by the neck 11. Other fastening principles may also be envisaged. The ring 2 also includes an annular disk 22 that is for flattening an annular neck gasket 4 against the annular edge of the neck 11. For appearance purposes, the skirt 21 and the disk 22 may be covered with a covering hoop 3 that advantageously masks the ring 2 completely. By way of example, the hoop 3 may be made of metal. At the inner periphery of the disk 22, the ring 2 is extended axially upwards by a threaded section 23. The ring 2 is thus extended once again downwards, defining a sealing slide-cylinder 25 that is disposed in coaxial manner inside the threaded section 23. At the junction between the threaded section 23 and the slide cylinder 25, the ring 2 forms one or more vent holes 24. The ring 2 is extended further downwards substantially in register with the slide cylinder 25, forming a shell 26 that extends inside the neck 11. The shell 26 presents a main section that is substantially circularly cylindrical, and a bottom portion that is rounded in the shape of a dome. At its lowest point, the shell forms an engagement section 28 in which there is engaged a dip tube 5 that extends inside the reservoir 1 into the proximity of its bottom wall (not shown). The dip tube communicates with the inside of the shell 26 through an injection orifice 27 that is formed at the low point of the shell 26 inside the engagement section 28. The size of the injection orifice may be of millimeter order.

The ring 2 may be made as a single part, or, in a variant, by assembling a plurality of separate parts. The shell 26 may be a distinct part that may be made of a transparent plastics material.

The applicator member of the invention is made by assembling together three component elements, namely a cap 6, a tube 7, and a grip member 8. The three parts are assembled together in permanent manner so as to constitute a single part. Without going beyond the ambit of the invention, the cap 6 may be made integrally with the tube 7 or with the grip member 8. Using three assembled-together parts satisfies technical criteria for ease of molding and of assembly, and also criteria for attractiveness. It is also possible to make the applicator member as a single part.

The cap 6 is a part, preferably made by injection-molding plastics material, that is circularly symmetrical about the axis X, as is the ring 2. The cap 6 includes a bushing 63 that is internally threaded and that is for coming into engagement with the threaded section 23 of the ring 2. Thus, the bushing 63 may be screwed on or off the ring 2. A hard point at the end of screw-fastening makes it possible to indicate to the user that screw-fastening has been fully achieved. The cap 6 also defines a vent lip 64 that is for interrupting the passage between the vent holes 24 and the outside. The lip may also be replaced by a gasket. The cap 6 also defines a piston 65 that is for sliding in leaktight manner inside the slide cylinder 25 of the ring 2. Thus, when the cap 6 is screwed on or off, the piston 65 slides in leaktight manner in the cylinder 25. Finally, the cap 6 defines a stopper 67 that is engaged in the tube 7, as described below. When the cap 6 is screwed tight onto the ring 2, the vent lip 64 prevents any communication between the vent holes 24 and the outside. However, when the cap 6 is unscrewed from the ring 2, the vent lip 64 is no longer in contact with the ring 2, and the vent holes 24 find a passage to the outside between the threaded section 23 and the threaded bushing 63. Given that the vent holes 24 are in direct communication with the inside of the reservoir 1, it is possible to vent the reservoir when the cap 6 is unscrewed from the ring 2. However, when the cap 6 is screwed tight onto the ring 2, the inside of the reservoir 1 is isolated from the outside.

The tube 7 may be made by injection molding a plastics material, preferably a transparent plastics material. It may also be made of metal (to feel cold), glass, ceramic, etc. The tube 7 defines a bottom section 71 and a top section 75, and presents an internal through passage that is closed in the top section 75 by the stopper 67 of the cap 6. In its bottom section 71, the tube 7 defines an extraction and application space 70. The space 70 presents a closed top end 74 that is closed by the stopper 67, and an open bottom end 73, so that the its volume is defined and constant. It is also possible to define the space 70 as a blind housing that is closed at its top end 74 and open at its bottom end 73. The tube 7 is secured to the cap 6 by engaging its top section 75 in the piston 65, and by engaging the stopper 67 in its through passage. The bottom portion 71 of the tube, inside which the extraction and application space 70 is formed, extends freely and axially downwards, projecting below the cap 6. It should be observed that the outside wall 72 of the bottom section 71 is rounded, such that the only sharp edge defined at this level is the edge that defines the open bottom end 73 of the space 70. The extraction and application space 70 may present the following dimensions: 3 mm in diameter and 10 mm in height.

It should be observed that the bottom section 71 of the tube 7 is engaged inside the shell 26 of the ring 2, defining shapes that are substantially complementary. A metering chamber C of variable volume is thus defined between the shell 26 and the tube 7, with said volume varying as the cap 6 is screwed on and off the ring 2. The metering chamber C is closed at its top end by the leaktight contact defined between the piston 65 and the slide cylinder 25. At its bottom end, the metering chamber C communicates directly with the reservoir 1 through the injection orifice 27 and the dip tube 5. The extraction and application space 70 forms an integral part of the metering chamber C and constitutes a constant-volume portion thereof. It can also be said that the variable-volume portion of the metering chamber C is constituted by everything that is situated outside the space 70.

In particular, it should be observed that no component element of the dispenser penetrates into the space 70. Its open end 73 is situated just above the injection orifice 27. The way in which the space 70 is filled with fluid during the removal of the applicator member is described below.

Finally, the grip member 8 is fastened on the cap 6 by means of a collar 86 that becomes engaged in permanent manner around the threaded bushing 63. The grip member 8 includes a grip head 81 via which the user may hold the grip member. By exerting rotary torque on the grip head 81, the cap 6 is turned so as to screw the ring 2 on/off.

Figure 1B:
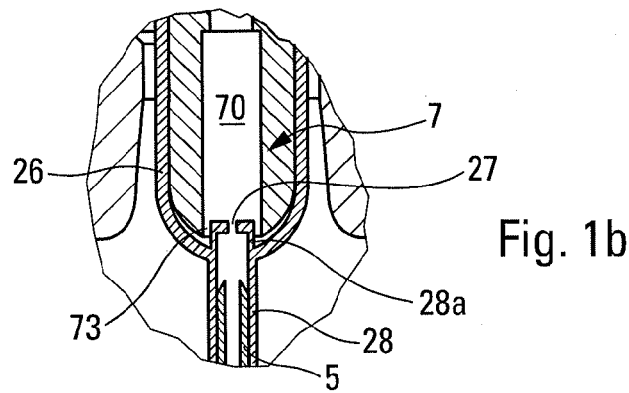
FIG. 1b is a variant of the FIG. 1a embodiment.
Figure 2:
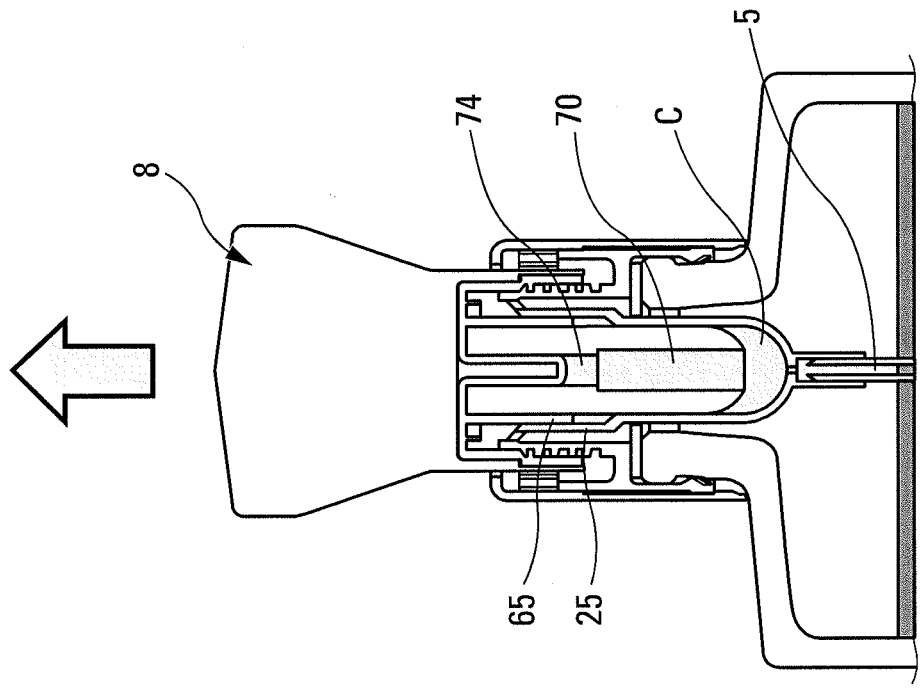
FIGS. 2, 3, 4, 5, 6, and 7 are views similar to the FIG. 1a view showing the various steps of a complete operating cycle of the dispenser.

FIG. 1b shows a slight variation of the FIG. 1a embodiment, in which the injection orifice 27 is formed at the top end of a small extension tube 28a that projects into the chamber C and slightly penetrates into the space 70. However, it should be observed that the injection orifice 27 is nevertheless situated at the open end 73 of the space 70. In addition, when the fluid is injected into the space 70 (FIG. 4), the injection orifice 27 has already been removed from the space 70 and is at a distance from its open end 73. The jet of fluid has to pass through a portion of the chamber C before reaching the space 70.

Figure 3:
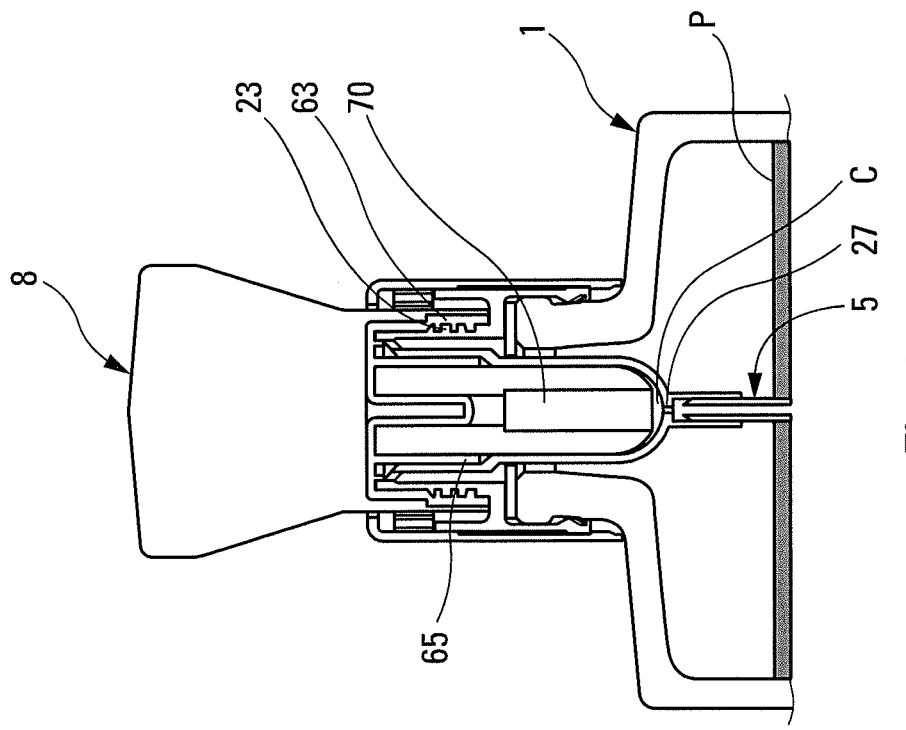
Figure 4:
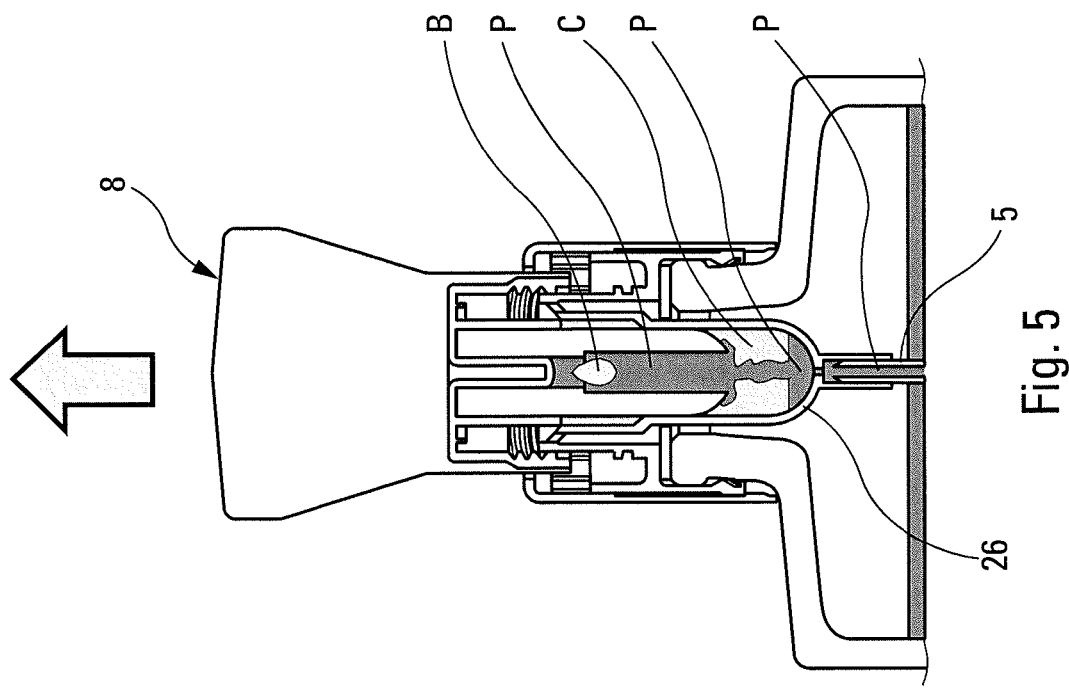
Figure 5:
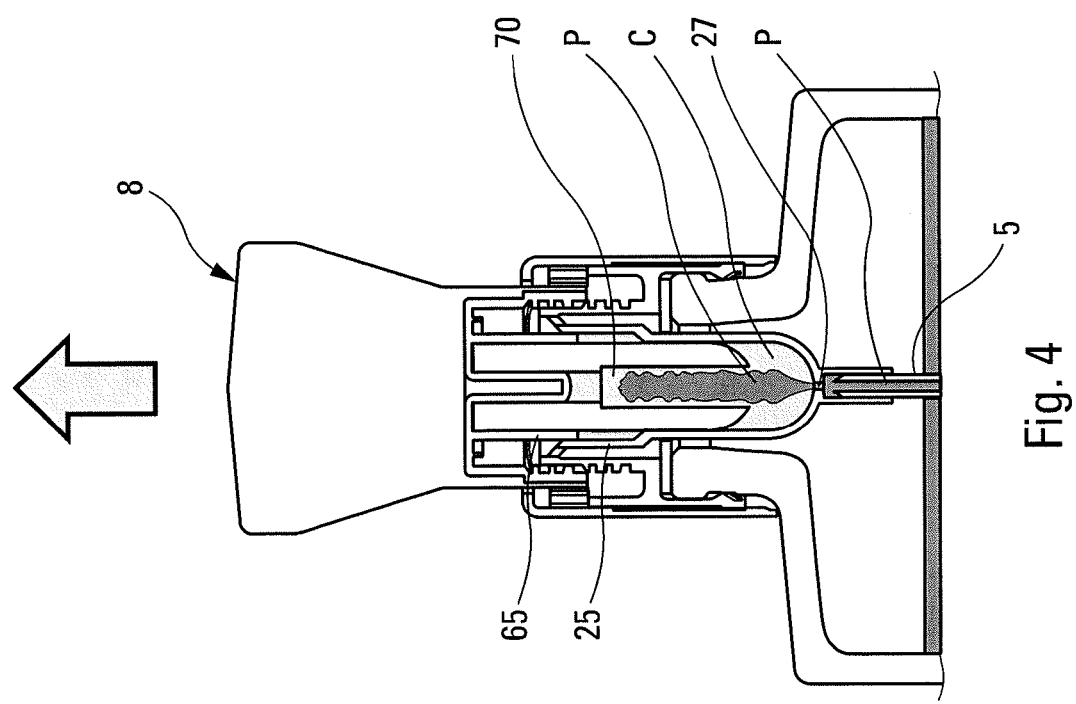
Figure 7:
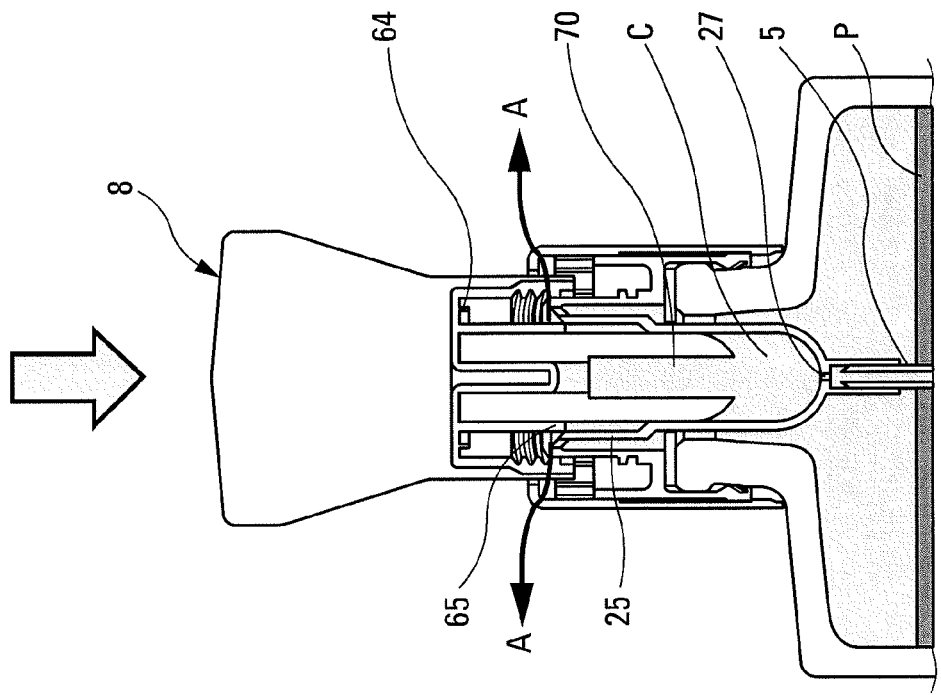
Figure 6:
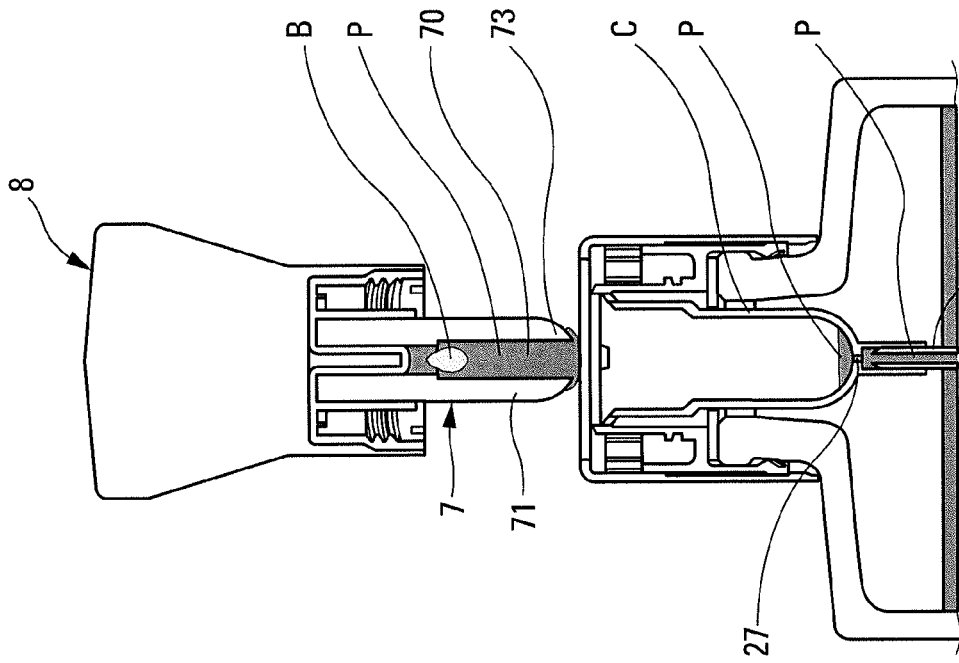

A complete operating cycle is described below with reference to FIGS. 2 to 7. Starting from FIG. 2 that shows the dispenser in the same state as in FIG. 1a, when the user unscrews the grip member 8 by holding the reservoir still, the piston 65 slides in leaktight manner inside the cylinder 25 to provide a means for sucking. This relative movement between the piston and the ring 2 has the effect of increasing the working volume of the metering chamber C, thereby creating suction in the chamber C and the dip tube 5: this is shown in FIG. 3 by the gray zones. By continuing to remove the applicator member from the ring 2, fluid P originating in the reservoir 1 is sucked through the dip tube 5 and the injection orifice 27: this is shown in FIG. 4 which shows an axial jet of fluid P under pressure being injected into the extraction and application space 70 through the chamber C. The space is moving away from the injection orifice, but the jet is powerful enough to penetrate deep into the space. At this moment, only the space 70 receives fluid. FIG. 5 shows the dispenser just before the piston ceases to be in leaktight sliding contact with the cylinder 25: the chamber C is thus still under suction (gray zones). The space 70 is filled with fluid P, except possibly for a small air bubble B that may form in its top portion. It can also be seen that a small quantity of fluid P is present in the bottom portion of the shell 26. When the applicator member is removed completely from the ring, as visible in FIG. 6, the fluid P that has been injected into the space 70 is retained by capillarity: a meniscus is formed at the open bottom end 73 of the space 70. The small air bubble B floats in the space 70. A small quantity of fluid P is still present in the bottom portion of the shell 26.

Once the fluid has been spread over the target surface by means of the tube 7, and the space 70 has thus been emptied, the piston 65 is once again inserted into the cylinder 25, thereby reforming the metering chamber C, isolating it from the outside. Driving the piston 65 into the cylinder 25 causes pressure to be increased in the chamber C by decreasing its working volume. The small quantity of fluid P remaining in the chamber C is forced to flow through the injection orifice 27 and the dip tube 5, into the reservoir 1. Thus, there is no fluid in the chamber C; this is visible in FIG. 7. The dip tube 5 is even emptied of fluid in the rest position. Thus, the fluid stored in the reservoir is not in direct contact with the outside air. The ring 2 forms a first barrier offering a single outlet passage through the dip tube. In addition, the applicator member closes this passage to the outside by forming a metering chamber of minimum volume in the rest position. It should thus be observed that the air that is held captive in the dispenser when the piston 65 is once again in leaktight sliding contact in its cylinder 25 may escape through the vent holes 24 (arrow A) until the vent lip 64 comes to interrupt the passage on the cap being screwed on tight. The dispenser is thus once again in the FIG. 2 state.

By making the shell 26 and the tube 7 out of a transparent plastics material, the user may observe the extraction and application space being filled without understanding how it is filled, where filling is based on injection and not only on suction. This gives the dispenser an element of mystery that contributes to improving its image.

What is claimed is:
1. A fluid dispenser comprising:
a fluid reservoir containing fluid;
a fluid suction chamber of variable volume that includes an extraction and application space, the space defining an open end and a closed end, the space communicating with the remainder of the chamber via the open end, the chamber forming an injection orifice communicating with the reservoir through a dip tube, the injection orifice defining an injection axis, and wherein a bottom of the fluid suction chamber is formed by a shell, and a shoulder is formed at a bottom surface of the shell where the shell meets the injection orifice;

suction means for sucking, during a suction stage, fluid from the reservoir into the chamber through the injection orifice;

wherein the extraction and application space has a constant volume, the injection orifice being situated at the open end of the extraction and application space, such that the fluid is injected in the form of an axial jet into the extraction and application space and fills the extraction and application space without the injection orifice penetrating into the space, wherein the suction is created exclusively by displacing a piston and a blind tube together relative to the shell, and the piston is not movable into any portion of the extraction and application space, and wherein the blind tube and the extraction and application space are movable together relative to the shell.

2. A dispenser according to claim 1, wherein the space is formed by the blind tube having a constant volume that is secured to a grip member that is movable along the injection axis.

3. A dispenser according to claim 2, wherein the blind tube is disposed in the shell.

4. A dispenser according to claim 3, wherein the shell defines a sealing slide-cylinder in which there slides the piston that is secured to the grip member in such a manner as to create suction in the chamber by pulling axially on the grip member.

5. A dispenser according to claim 4, wherein the increase in volume of the chamber during the suction stage is greater than the volume of the space.

6. A dispenser according to claim 3, wherein the tube and the shell are transparent, such that the fluid that fills the space is visible through the tube and the shell.

7. A dispenser according to claim 3, wherein the tube includes a free bottom edge that is rounded towards the inside, and that defines the open end of the space.

8. A dispenser according to claim 1, wherein, at the start of the suction stage, the open end of the space is situated axially just above the injection orifice.

9. A dispenser according to claim 1, wherein the dip tube is transparent so as not to be entirely visible in the fluid.

10. The dispenser according to claim 1, wherein the space is substantially axially cylindrical, defining an inside diameter of 3 mm.

11. The dispenser according to claim 1, wherein the injection orifice has a diameter of 1 mm.

12. The dispenser according to claim 1, wherein the space has an axial height of 1 cm.

13. A fluid dispenser comprising:

a fluid reservoir containing fluid;

a fluid suction chamber of variable volume that includes an extraction and application space, the extraction and application space defining an open end and a closed end, the open end positioned below the closed end;

the extraction and application space in fluid communication with the chamber via the open end, the chamber forming an injection orifice in fluid communication with the reservoir through a dip tube that is in fluid communication with the reservoir at one end and the injection orifice at the other end, the injection orifice defining an injection axis, and wherein a bottom of the fluid suction chamber is formed by a shell, and a shoulder is formed at a bottom surface of the shell where the shell meets the injection orifice; and a piston that creates suction when actuated to pull fluid from the reservoir into the chamber through the injection orifice; and the injection orifice ii faces the open end of the extraction and application space, such that the fluid is injected in the form of an axial jet into the extraction and application space without the injection orifice penetrating into the space, wherein the suction is created exclusively by displacing the piston and a blind tube together relative to the shell, and the piston is not movable into any portion of the extraction and application space, and wherein the blind tube and the extraction and application space are movable together relative to the shell.

14. The dispenser according to claim 13, wherein the extraction and application space has a constant volume.

15. The dispenser according to claim 13, wherein the injection orifice is always disposed outside of the extraction and application space while the extraction and application space is filled with fluid.

* * * * *